United States Patent
Jang et al.

(10) Patent No.: US 8,956,710 B2
(45) Date of Patent: *Feb. 17, 2015

(54) VACUUM INSULATION PANEL

(75) Inventors: Suk Jang, Seoul (KR); Sung Seock Hwang, Chungcheongbuk-do (KR); Seung Min Jeon, Busan (KR); Myung Lee, Gyeonggi-do (KR); Jung Pil Han, Ulsan (KR)

(73) Assignee: LG Hausys, Ltd., Seoul (KR)

( * ) Notice: Subject to any disclaimer, the term of this patent is extended or adjusted under 35 U.S.C. 154(b) by 239 days.

This patent is subject to a terminal disclaimer.

(21) Appl. No.: 13/502,863

(22) PCT Filed: Oct. 5, 2010

(86) PCT No.: PCT/KR2010/006783
§ 371 (c)(1),
(2), (4) Date: Apr. 19, 2012

(87) PCT Pub. No.: WO2011/049304
PCT Pub. Date: Apr. 28, 2011

(65) Prior Publication Data
US 2012/0207963 A1 Aug. 16, 2012

(30) Foreign Application Priority Data
Oct. 23, 2009 (KR) .................. 10-2009-0101427

(51) Int. Cl.
*F16L 59/065* (2006.01)
*E04B 1/80* (2006.01)

(52) U.S. Cl.
CPC ............. *E04B 1/803* (2013.01); *F25D 2201/14* (2013.01); *Y02B 80/12* (2013.01)
USPC ........................................................ 428/69

(58) Field of Classification Search
CPC ............................... F16L 59/065; E04B 1/803
USPC .......................................................... 428/69
See application file for complete search history.

(56) References Cited

U.S. PATENT DOCUMENTS

| | | | | |
|---|---|---|---|---|
| 5,693,399 A | * | 12/1997 | Himeshima et al. | 428/69 |
| 6,740,394 B2 | * | 5/2004 | Jacobsen et al. | 428/216 |
| 8,663,773 B2 | * | 3/2014 | Jang et al. | 428/69 |
| 2006/0261718 A1 | * | 11/2006 | Miseki et al. | 312/409 |

FOREIGN PATENT DOCUMENTS

| | | |
|---|---|---|
| EP | 1724513 A2 | 11/2006 |
| JP | 10-122477 A | 1/1998 |
| JP | 11-281245 A | 10/1999 |

(Continued)

*Primary Examiner* — Alexander Thomas
(74) *Attorney, Agent, or Firm* — McKenna Long & Aldridge, LLP

(57) ABSTRACT

Disclosed are a vacuum insulation panel, a method for manufacturing the same and an insulation box having the same. By cutting the core material correspondingly to shape and thickness of the absorbent without cut of the core material and pressing the absorbent securing part to form the groove for placing the absorbent therein, the vacuum insulation panel prevents partial deterioration of heat transmission caused by the cutoff of the core material or deterioration of the smoothness caused by placing the absorbent above the core material or between the core materials. Particularly, it is possible to prevent the phenomenon that the periphery is pressed together, which is shown in a conventional press process, to thereby improve the smoothness by cutting the core material in shape and depth corresponding to the shape and thickness of the absorbent prior to the press of the absorbent securing part. Therefore, it is possible to provide an energy saving insulation box by reducing generation of wrinkle or poor sealing of the surface material of the vacuum insulation panel to thereby increase insulation efficiency of the vacuum insulation panel for a long time.

15 Claims, 3 Drawing Sheets

(56) References Cited

FOREIGN PATENT DOCUMENTS

| JP | 2004-011709 A | 1/2004 |
| JP | 2004-218747 | 8/2004 |
| JP | 2006-021429 | 1/2006 |
| JP | 2006-021429 A | 1/2006 |

* cited by examiner

VACUUM INSULATION PANEL

This application is a National Stage Entry of International Application No. PCT/KR2010/006783, filed Oct. 5, 2010, and claims the benefit of Korean Application No. 10-2009-0101427, filed on Oct. 23, 2009, which is hereby incorporated by reference for all purposes as if fully set forth herein.

TECHNICAL FIELD

The present invention relates to a vacuum insulation panel, a method for manufacturing the same and an insulation box having the same.

BACKGROUND ART

A refrigerator is a product designed to keep an internal temperature thereof at a predetermined temperature or lower for the purpose of fresh storage of food. Therefore, in order to keep cold air generated in an inside of the refrigerator and prevent heat outside the refrigerator from permeating into the inside of the refrigerator, an insulation layer is formed between an inner case and an outer case of the refrigerator during manufacture of the refrigerator. The insulation layer is generally formed by filling foaming liquid between the inner case and the outer case and hardening the foaming liquid. An inside of a microcell of a polyurethane insulation layer is filled with carbon dioxide gas and foaming agent gas generated by vaporization due to high heat during reaction. However, CFC, HCFC and cyclopentane, or the foaming agent gas, and the carbon dioxide has high thermal conductivity, which causes deterioration in insulation property of the polyurethane insulation layer. Therefore, a vacuum insulation panel having high insulation property is used to supplement the insulation effect of the aforementioned polyurethane insulation layer. In general, a vacuum insulation panel having a predetermined size is inserted between the inner case and the outer case of the refrigerator and conventional polyurethane foam is filled around the vacuum insulation panel.

The vacuum insulation panel is an insulation panel, in which foamed resin or fiber material is put as a core material into a surface material, and has a considerably reduced thermal conductivity of a gas by keeping an inside of the insulation panel in vacuum. In order to keep the insulation performance of the vacuum insulation panel for a long period, it is necessary to continuously keep the inside of the insulation panel in vacuum. However, when a pinhole is generated in the surface material during manufacture of the vacuum insulation panel or sealing of a thermal bonding layer is loosened with time, gas or moisture permeates into the inside of the vacuum insulation layer to lower a degree of vacuum. Therefore, to prevent the deterioration of the insulation performance, inclusion of an absorbent such as silica gel, calcium oxide and zeolite has been suggested.

This absorbent is generally placed above the core material or between the core materials, or placed in a securing part made by cutting some portion of the core material, and in this case, there has been a problem that smoothness or the insulation performance is deteriorated.

DISCLOSURE OF INVENTION

Technical Problem

It is an object of the present invention to provide a vacuum insulation panel, in which an absorbent is placed such that smoothness of the vacuum insulation panel can be improved and deterioration of a thermal conductivity can be prevented.

Solution to Problem

As described above, when the absorbent is placed above the core material or between the core materials, the smoothness of a vacuum insulation panel is lowered and this may be a cause of generation of a pinhole in a surface material or poor sealing of the surface material to thereby deteriorate vacuum performance of the vacuum insulation panel. Also, when an absorbent securing part is provided by cutting some portion of the core material, a density of the core material is reduced at the portion corresponding to the absorbent securing part to thereby cause partial deterioration of the thermal conductivity.

To solve the problem, the present invention provides a vacuum insulation panel, in which an absorbent securing part of a core material is formed by cutting the core material in shape and depth corresponding to the shape and thickness of an absorbent and pressing the cut portion.

In one embodiment, the present invention provides a vacuum insulation panel including: a core material; a surface material for covering the core material; and an absorbent placed in a securing part of the core material, wherein the securing part of the core material is a groove formed by cutting the core material in shape and depth corresponding to the shape and thickness of an absorbent and pressing the cut portion.

Also, the present invention provides a method of manufacturing a vacuum insulation panel including: a core material; a surface material for covering the core material; and an absorbent placed in a securing part of the core material, wherein the securing part of the core material is formed by cutting the core material in shape and depth corresponding to the shape and thickness of an absorbent and pressing the cut portion.

Preferably, the absorbent securing part is formed in a shape of a groove by the press process. Preferably, the absorbent securing part has a shape of a groove which has shape and depth corresponding to shape and thickness of the absorbent. Preferably, the absorbent securing part is previously cut in shape and depth corresponding to the shape and thickness of the absorbent prior to the press of the core material. In the present invention, the shape and depth "corresponding to" the shape and thickness of the absorbent do not means that the shape and depth are identical to the shape and thickness of the absorbent, but means that the securing part has such shape and depth that the groove can secure the absorbent. Since the absorbent securing part is subjected to a decompression process after cut and pressed, size and depth of the absorbent securing part may differ before and after the decompression. Therefore, the core material should be cut in consideration of variation in the size and depth of the shape due to the overall volume reduction. In the present description, when the thickness of the absorbent and the depth of the absorbent securing part are described identical, the depth of the absorbent securing part may be a depth after decompression.

In a general press process in which press is performed without cutting, periphery is pressed together with the portion to be pressed and an overall shape of the core material may be twisted according to strength of the core material to lower the smoothness. The lowering in the smoothness results in long-term deterioration of the insulation performance since the lowering in the smoothness is a cause of generation of a pinhole in a surface material or poor sealing of the surface material.

On the contrary, in the vacuum insulation panel of the present invention, it is possible to prevent the phenomenon that the periphery is pressed together, which has been shown in a conventional press process, to thereby improve the smoothness by cutting the core material in shape and depth corresponding to the shape and thickness of the absorbent prior to the press of the absorbent securing part. Therefore, use of the vacuum insulation panel of the present invention can reduce generation of wrinkle or poor sealing of the surface material of the vacuum insulation panel. Moreover, since the absorbent securing part is not formed into a groove shape by cutting off some portion of the core material as described above, it is possible to prevent partial deterioration in thermal conductivity due to difference in density or thickness of the core material. Therefore, the vacuum insulation panel can provide an energy saving insulation box since it can keep the insulation effect for a long time.

Any material can be used for the core material, provided that it is known to be usable in a vacuum insulation panel. The core material may include, though not particularly limited to, one of inorganic fiber such as glass fiber, organic fiber such as polyester fiber, resin foam such as polyurethane, polyethylene and polypropylene, inorganic powder such as silica, pearlite and carbon black, and organic powder such as synthetic resin powder, or a combination thereof. Also, a textile binder, or an inorganic or organic liquid binder may be used to manufacture the core material. For example, the core material may be manufactured by cutting fiber material such as a stacked body of glass fibers and a stacked body of organic fibers into suitable size and shape.

In one embodiment, the core material may be a glass fiber board, a glass wool or a stacked body of one or more selected therefrom. For example, the glass fiber board may be manufactured by dispersing glass finer into an inorganic binder. Such glass fiber board may be used in a single layer or in a form of a stacked body of 1 to 5 glass fiber boards. A thickness of the glass fiber board may be 1 to 16 mm when it is used in a single layer, and a thickness of one sheet of the glass fiber board may be 4 to 10 mm when it is used in a form of a stacked body. When the core material includes such glass fiber board, aging of the core material may be performed before the core material is received in the surface material to remove moisture or gas present in the core material. It is preferable that a heating temperature is 110° C. or higher in order to remove the moisture on the surface of the core material, and particularly for the glass fiber, it is more preferable that the aging is performed at 180° C. or higher in order to reduce a moisture content of the core material maximally. For another example, a stacked body of glass wool made by pressurizing and heating 1 to 4 glass wools for 5 to 15 minutes at 500 to 500° C. and stacking them may be used as the core material. Alternatively, a core material having a composite structure manufactured using the glass fiber board and thermocompressed glass wool together may be used.

A diameter of the glass fiber used in the manufacture of the core material is not particularly limited, but is preferably 1 to 10 μm in consideration that a mean diameter of the glass fiber has influence on thermal conductive property and cost of the glass fiber.

Meanwhile, the absorbent securing part formed in the core material is formed into a depth corresponding to a thickness of an absorbent, and the core material has a thickness greater than the depth of the absorbent securing part. Though not particularly limited to, for example, the thickness of the core material is 5 to 20 mm, the thickness of the absorbent is 2 to 4 mm and the depth of the absorbent securing part is 2 to 4 mm. When the absorbent securing part is formed in accordance with the present invention, difference in thickness between the portion where the absorbent is present and the portion where the absorbent is not present is reduced to 1 mm or less to thereby improve the smoothness.

In the vacuum insulation panel of the present invention, the core material is decompressively sealed between the surface materials. The surface material is a multilayer film which includes a thermal bonding layer, metal foil layer and one or more protective layer. The thermal bonding layer is present in the innermost layer of the surface material to thermally bond the innermost layers of the one or more multilayer film. Decompressive sealing by the surface material is performed by placing the innermost layers of the one or more multilayer film used as the surface material so as to face with each other, and then bonding the thermal bonding layers, i.e. the innermost layers with the core material being put therebetween and at the same time discharging air from an inside of the surface material to make the inside in vacuum state.

In order to enhance the sealing quality while increasing the smoothness without generation of wrinkle or poor sealing when the core material is decompressively sealed with the surface material, the thickness of the surface material is preferably 60 to 130 μm. Also, it is preferable that the surface material has flexibility, which allows extension or bending within a range in that it does not damage the gas barrier property according to the shape or size of the core material during the manufacture of the vacuum insulation panel.

In the vacuum insulation layer of the present invention, the thermal bonding layer may be made of polyethylene resin such as linear low density polyethylene (LLDPE), low density polyethylene (LDPE), very low density polyethylene (VLDPE) and high density polyethylene (HDPE), thermally bondable resin other than the polyethylene or a mixture thereof. Since the polyethylene resin can be boded at a relatively low temperature, it can be easily bonded by additional heating and allows manufacture of the vacuum insulation panel at a low cost. In one embodiment, the thermal bonding layer is made of LLDPE. LLDPE has excellent mechanical properties such as thermal bonding strength, pinhole resistance and impact resistance as compared with HDPE or other thermally bondable films. Also, employment of LLDPE in the thermal bonding layer of a vacuum insulation panel enhances the gas barrier property since LLDPE shows the gas barrier property equal to or higher than that of HDPE.

The thermal bonding layer not only has a large influence on control of gas permeation but also has a large influence on maintaining of long-term insulation performance of a vacuum insulation panel. Therefore, the thickness of the thermal bonding layer is, though not particularly limited to, 30 to 70 μm in consideration of long-term stability of thermal bonding and mechanical strength of the surface of the surface material when using a metal foil as the gas barrier layer.

In the present invention, the gas barrier layer included in the surface material can employ any material provided that it can be used for the purpose of reduction of gas permeation. Though not particularly limited to, a metal foil or a plastic film deposited with metal, metal oxide or diamond-like carbon may be used as the gas barrier layer. For example, the metal foil is an aluminum foil or a stainless steel foil. Also, the material deposited on the plastic film may include aluminum, iron, cobalt, nickel, zinc, copper, silver, silica and alumina, but not particularly limited thereto. Further, the material of the plastic film on which the metal, etc. is deposited includes, though not particularly limited to, one or more resin selected from the group consisting of polyamide, polyimide, polypropylene, polyethylene terephthalate, polyethylene naphthalate, polyacrylonitrile, polyvinyl alcohol and ethylene vinyl alcohol. In one embodiment, the gas barrier layer may be a metal foil, for example, an aluminum foil. In another embodiment, the gas barrier layer may include an aluminum foil and an ethylene vinyl alcohol film. When the ethylene vinyl alcohol film is placed between the thermal bonding layer and the aluminum foil, barrier performance of a bending portion is enhanced to lengthen a long-term endurance life of an entire vacuum insulation panel. Meanwhile, in order to ensure a sufficient gas barrier property, a thickness of the gas barrier layer may be 4 to 10 μm.

The surface material also includes one or more protective layer for ensuring pinhole resistance and mechanical strength of the film. The one or more protective layer may be made of one or more resin selected from the group consisting of polyamide, polypropylene, polyethylene terephthalate, polyacrylonitrile, polyvinyl alcohol and ethylene vinyl alcohol, respectively. As the protective layer that covers the innermost layer and the gas barrier layer is provided, the vacuum insulation panel comes to have scratch resistance and piercing resistance to thereby be able to prevent generation of pinhole and give long-term reliability to the vacuum insulation panel. In one embodiment, the surface material may include, from the inner side thereof, a thermal bonding layer, a gas barrier layer, a first protective layer and a second protective layer. In one embodiment, the first protective layer may be a polyamide layer and the second protective layer may be a polyethylene terephthalate layer. Polyethylene terephthalate not only has excellent surface protective effect but also is inexpensive to thereby allow manufacture of a vacuum insulation panel of the present invention with low cost. The polyethylene terephthalate layer may, if necessary, employ a polyethylene terephthalate film (K-PET) of which outside is coated with polyvinylidene chloride (PVDC). The protective layer may have a thickness of 30 to 50 μm in consideration of pinhole resistance or mechanical strength, and the thicknesses of the first protective layer and the second protective layer can be properly controlled in the aforementioned range according to physical properties of the protective layer to be obtained.

Meanwhile, the vacuum insulation panel of the present invention includes an absorbent that can absorb moisture or gas. Any material can be used as the absorbent provided that it is known as a gas absorbent or a moisture absorbent. For example, the absorbent may be used in substitution or in combination with known absorbent including a gas absorbent such as calcium oxide, quicklime and metal oxide, alloy such as barium-lithium alloy, and hydrophobic molecular sieve in which absorbing ability of volatile or hydrophobic organic gas is increased. In one embodiment, the absorbent is calcium oxide.

The absorbent may be one packaged in a packaging material. In the present invention, the absorbent may be interpreted as a state of being packaged in a packaging material. The packaging material for the absorbent may employ an air permeable packaging material. For example, the absorbent packaging material of the present invention may include, though not particularly limited to, one or more layer selected from the group consisting of water resisting paper layer, air permeable polyethylene layer, air permeable polypropylene layer and air permeable polyethylene propylene layer. For example, the absorbent packaging material may be a stacked film including water resisting paper layer and air permeable polyethylene layer, a stacked film including water resisting paper layer and air permeable polypropylene layer, or a stacked film including air permeable polyethylene layer and air permeable polypropylene layer. The air permeable resin layer includes a film layer or non-woven layer having micropores. In one embodiment, the absorbent packaging material may be a stacked film including water resisting paper layer and air permeable polypropylene layer.

The present invention also provides an insulation box including the above described vacuum insulation panel. The insulation box includes an inner box, an outer box and a vacuum insulation panel placed in a space formed by the inner box and the outer box. In the space between the inner box and the outer box where the vacuum insulation panel is placed, a foamed insulation material can be provided. When the foamed insulation material is provided, at least some of the vacuum insulation panel can be buried in the foamed insulation material. In accordance with the present invention, it is possible to provide an energy saving insulation box by reducing generation of wrinkle or poor sealing of the surface material of the vacuum insulation panel to thereby increase insulation efficiency of the vacuum insulation panel for a long time.

By cutting the core material correspondingly to shape and thickness of the absorbent without cut of the core material and pressing the absorbent securing part to form the groove for placing the absorbent therein, the vacuum insulation panel of the present invention prevents partial deterioration of heat transmission caused by the cutoff of the core material or deterioration of the smoothness caused by placing the absorbent above the core material or between the core materials. Particularly, it is possible to prevent the phenomenon that the periphery is pressed together, which is shown in a conventional press process, to thereby improve the smoothness by cutting the core material in shape and depth corresponding to the shape and thickness of the absorbent prior to the press of the absorbent securing part. Therefore, in accordance with the present invention, it is possible to provide an energy saving insulation box by reducing generation of wrinkle or poor sealing of the surface material of the vacuum insulation panel to thereby increase insulation efficiency of the vacuum insulation panel for a long time.

BRIEF DESCRIPTION OF MAIN ELEMENTS

Figure 1:
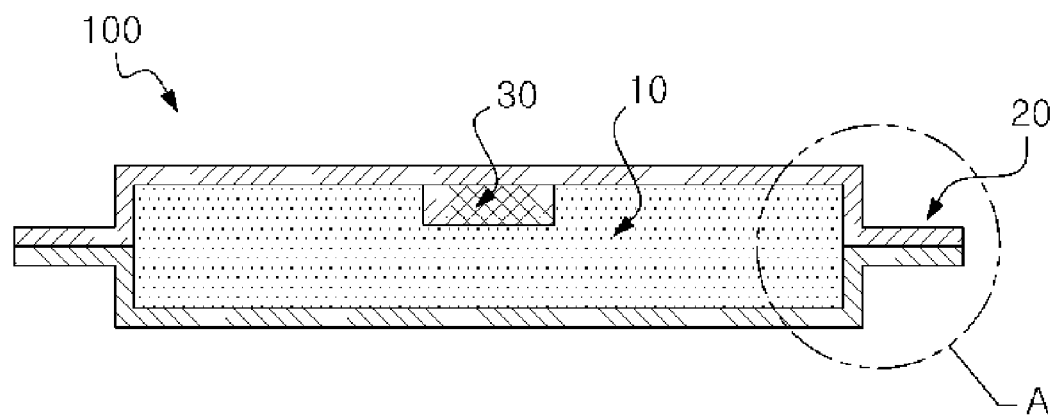
FIG. 1 is a sectional view illustrating a vacuum insulation panel in accordance with an embodiment of the present invention.

100: vacuum insulation panel 10: core material
12: absorbent securing part 20: surface material
22: thermal bonding layer 24: gas barrier layer
26: first protective layer 28: second protective layer
30: absorbent 40: absorbent securing part forming device
42: cutting knife 44: compression jig
46: compression spring 48: guide jig

MODE FOR THE INVENTION

Practical and presently preferred embodiments of the present invention are illustrative as shown in the following Examples. However, it will be appreciated that those skilled in the art, on consideration of this disclosure, may make modifications and improvements within the spirit and scope of the present invention.

EMBODIMENT

Hereinafter, an embodiment of the present invention will be described in detail with reference to accompanying drawings. The advantages, features and aspects of the invention will become apparent from the following description of the embodiment with reference to the accompanying drawings, which is set forth hereinafter. It should be noted that the drawings are not to precise scale and may be exaggerated in thickness of lines or size of components for the purpose of convenience and clarity only.

FIG. 1 is a sectional view illustrating a vacuum insulation panel 100 in accordance with an embodiment of the present invention. The vacuum insulation panel 100 includes a core material 10, an absorbent 30 provided in an absorbent securing part 12 formed in the core material 10, and a surface material 20 that covers the core material 10 and the absorbent 30. The core material 10 is surrounded and thus decompressively sealed by two surface materials 20.

Figure 2:
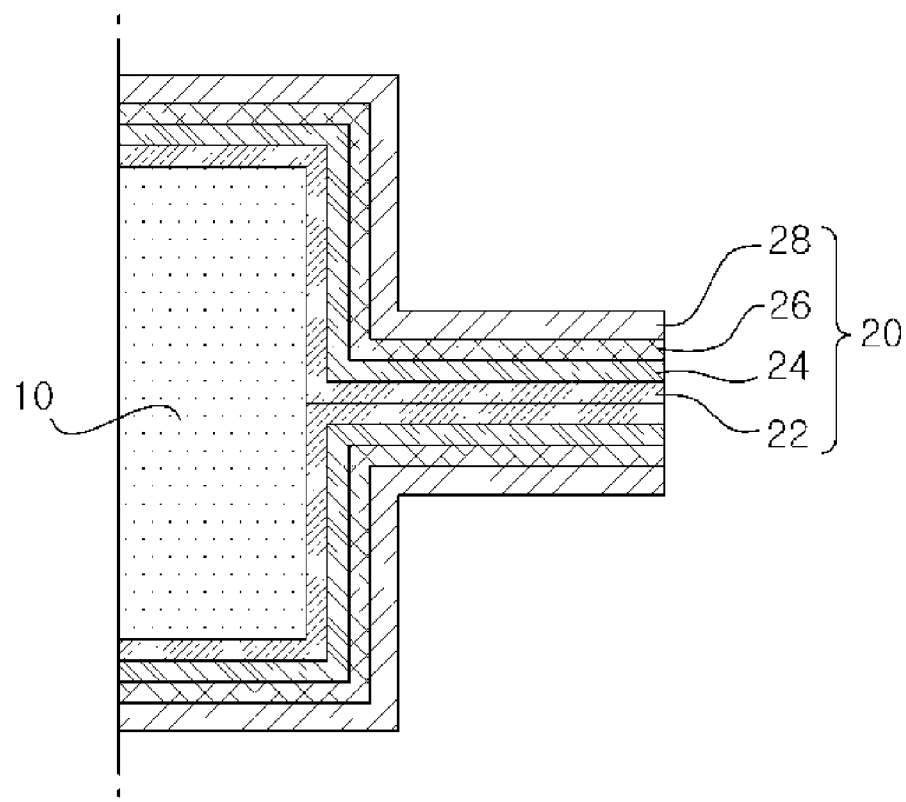
FIG. 2 is a sectional view illustrating a surface material, in which a side (A in FIG. 1) of the vacuum insulation panel in accordance with an embodiment of the present invention is enlarged.

FIG. 2 is a view illustrating the core material 10 formed with the absorbent securing part 12 and the absorbent 30 provided in the absorbent securing part 12 in accordance with an embodiment of the present invention. The absorbent securing part 12 is formed on the core material 10 in a shape of a groove having depth and shape corresponding to thickness and shape of the absorbent 30. The core material 10 is a stacked body of glass wools, in which a glass wool made by gathering glass fibers with a diameter of 3 to 5 µm is stacked in two layers, and has a thickness of 120 mm, and the absorbent securing part 12 is formed in a groove shape with a depth of 40 mm. When processing the core material into a vacuum insulation panel, the thickness of the core material is compressed into 9 mm, and the groove is compressed into a depth corresponding to the absorbent 30 having a thickness of 3 mm.

Figure 3:
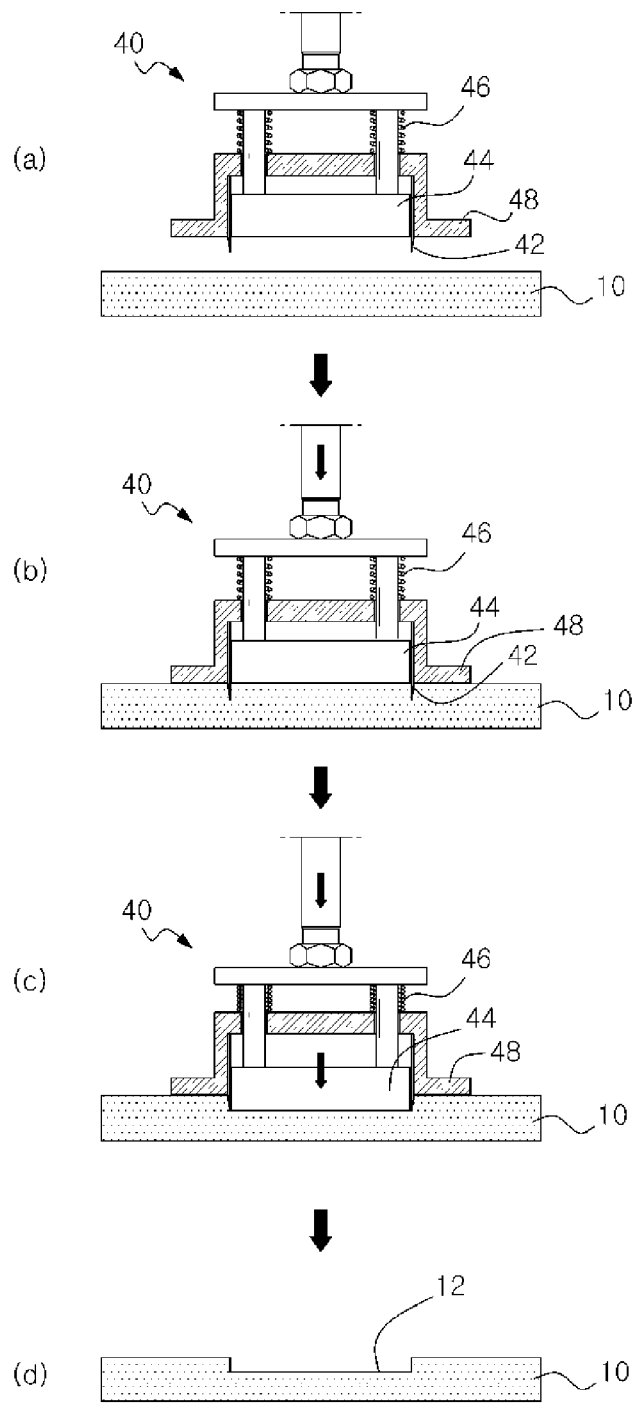
FIG. 3 is a view illustrating a process of cutting a portion of the securing part in the core material with a device for forming the absorbent securing part in the core material and at the same time pressing the portion of the securing part to form a groove.

FIG. 3 is a view illustrating a process of cutting a portion of the securing part in the core material 10 with a device 40 for forming the absorbent securing part 12 in the core material 10 and at the same time pressing the portion of the securing part to form a groove. The absorbent securing part forming device 40 is provided with a cutting knife 42 capable of cutting the portion of the securing part in the core material where the absorbent is to be placed and a compression jig 44 which presses the cut portion of the securing part in the core material. The compression jig 44 is driven by a compression spring 46. Also, the device 40 is provided with a guide jig 48 for securing the core material 10, and cutting and pressing the core material 10 at a correct position. The guide jig 48 and the cutting knife 42 are connected, and the cutting knife 42 is projected out of the guide jig 48 to a length corresponding to a cutting depth of the absorbent securing part. FIG. 3(a) shows a state that the core material 10 is placed below the absorbent securing part forming device 40 to prepare formation of the absorbent securing part. When the core material is prepared, as shown in FIG. 3(b), the cutting knife 42 connected with the guide jig 42 cuts the portion of the securing part first while the absorbent securing part forming device 40 moved down onto the core material 10. After that, the compression jig 44 presses the cut portion of the securing part as shown in FIG. 3(b). The compression jig 44 presses the portion of the securing part by the depth of the absorbent securing part 12 to be formed. FIG. 3(d) shows the core material 10 having the absorbent securing part 12 formed through the process as described above. Unlike the phenomenon that the periphery is pressed together is shown in a general press process, it can be seen that the portion of the securing part alone is clearly cut by previously cutting the portion of the securing part and then pressing the portion of the securing part. This has a large influence on enhancement of smoothness of the vacuum insulation panel.

Figure 4:
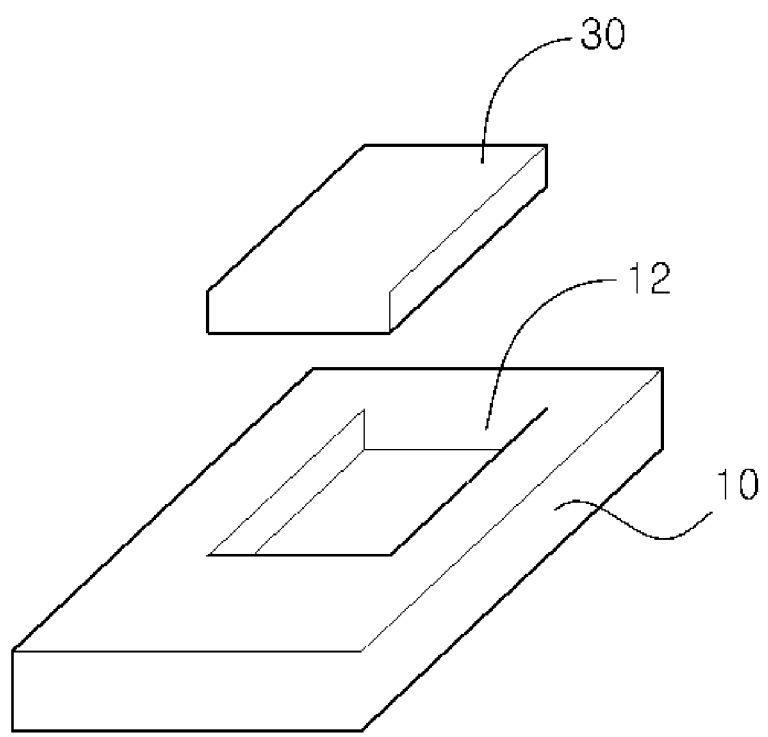
FIG. 4 is a view illustrating a core material formed with an absorbent securing part and an absorbent provided in the securing part in accordance with an embodiment of the present invention.

FIG. 4 is a sectional view illustrating a surface material, in which a side (A in FIG. 1) of the vacuum insulation panel in accordance with an embodiment of the present invention is enlarged. The surface material 20 is a laminate film, which includes, from the inner side thereof, a thermal bonding layer 22, a gas barrier layer 24, a first protective layer 26 and a second protective layer 28. The thermal bonding layers 22, or the innermost layers, are bonded in a state that they face with each other. In the surface material 20, the thermal bonding layer 22 is made of LLDPE, a polyethylene resin, with a thickness of about 50 µm, the gas barrier layer 24 is made of an aluminum foil layer with a thickness of about 6 µm, the first protective layer 26 is made of a nylon film with a thickness of about 25 µm, and the second protective layer 28 is made of a polyethylene terephthalate film (K-PET) with a thickness of about 12 µm which is coated with polyvinylidene chloride (PVDC).

Meanwhile, the absorbent 30 employed one in which CaO powder is sealed with a multilayer film of water resistant paper layer and PP non-woven layer. In order to prevent that the CaO powder is gathered into one portion, not only periphery of the packaging material but also middle portions of the packaging material were sealed to enhance smoothness of the surface of the vacuum insulation panel (not shown).

The surface material 20, the core material 10 and the absorbent 30 placed on the securing part 12 of the core material 10 were disposed in the vacuum insulation panel manufacturing device (not shown) and the thermal bonding layer 22 were bonded by heating the surface material 20 to a melting temperature by a heating plate above and below the surface material 20 and at the same time performing vacuum exhaustion, thereby manufacturing the vacuum insulation panel 100. From the result of measurement for a thermal conductivity of the vacuum insulation panel using thermal conductivity measuring equipment HC 074-200 (Eco company), it could be seen that the thermal conductivity of the absorbent securing part is 0.004662 Kcal/mhr° C. and reduction ratio in the thermal conductivity at the absorbent securing part is lowered to ¼ as compared with 0.02024 Kcal/mhr° C., a thermal conductivity of an absorbent securing part formed by cutting the core material into a groove shape. That is, in the core material in which the groove is formed by cutting some of the core material, difference in thermal conductivity between the core material and the absorbent securing part is very large and this may cause deterioration of overall thermal performance of the vacuum insulation panel. On the contrary, in the core material manufactured in accordance with the present invention, the difference in the thermal conductivity is notably reduced to thereby be able to prevent deterioration of overall thermal performance of the vacuum insulation panel.

Also, smoothness of the vacuum insulation panel 100 was measured, and as the result, difference in thickness between the portion where the absorbent is present and the portion where the absorbent is not present was 1 mm or less. This improvement in smoothness notably reduced generation of wrinkle or poor sealing of the surface material of the vacuum insulation panel and long-term insulation efficiency was thus enhanced.

While the present invention has been described with respect to the specific embodiments, it will be apparent to those skilled in the art that various changes and modifications may be made without departing from the spirit and scope of the invention as defined in the following claims.

The invention claimed is:

1. A vacuum insulation panel, comprising:
a core material;
a surface material for covering the core material; and
an absorbent placed in a securing part of the core material,
wherein the securing part of the core material is a groove formed by cutting the core material in shape and depth corresponding to shape and thickness of the absorbent and pressing the cut portion,
wherein the surface material is a multilayer film which includes a thermal bonding layer, a gas barrier layer, a first protective layer and a second protective layer, and
wherein the first protective layer is a polyamide layer and the second protective layer is a polyethylene terephthalate film (K-PET) of which outside is coated with polyvinylidene chloride (PVDC).

2. The vacuum insulation panel as set forth in claim 1, wherein the core material is a glass fiber board, a glass wool or a stacked body of one or more selected therefrom.

3. The vacuum insulation panel as set forth in claim 2, wherein the stacked body is a stacked body of glass wool.

4. The vacuum insulation panel as set forth in claim 1, wherein the core material is decompressively sealed between the surface materials.

5. The vacuum insulation panel as set forth in claim 1, wherein the thermal bonding layer is made of one or more resin selected from the group consisting of linear low density polyethylene (LLDPE), low density polyethylene (LDPE), very low density polyethylene (VLDPE) and high density polyethylene (HDPE).

6. The vacuum insulation panel as set forth in claim 1, wherein the thermal bonding layer is made of LLDPE.

7. The vacuum insulation panel as set forth in claim 1, wherein the gas barrier layer is a metal foil layer or a plastic film deposited with metal.

8. The vacuum insulation panel as set forth in claim 7, wherein the metal used in the metal foil layer or the plastic film deposited with metal is aluminum.

9. The vacuum insulation panel as set forth in claim 7, wherein the plastic film deposited with metal is made of one or more resin selected from the group consisting of polyamide, polyimide, polypropylene, polyethylene terephthalate, polyethylene naphthalate, polyacrylonitrile, polyvinyl alcohol and ethylene vinyl alcohol.

10. The vacuum insulation panel as set forth in claim 1, wherein the gas barrier layer includes an aluminum foil and an ethylene vinyl alcohol film.

11. The vacuum insulation panel as set forth in claim 1, wherein the absorbent is calcium oxide.

12. The vacuum insulation panel as set forth in claim 1, wherein the absorbent is packaged in a packaging material.

13. The vacuum insulation panel as set forth in claim 12, wherein the packaging material includes one or more layer selected from the group consisting of water resisting paper layer, air permeable polyethylene layer, air permeable polypropylene layer and air permeable polyethylene propylene layer.

14. The vacuum insulation panel as set forth in claim 12, wherein the packaging material is a stacked film including water resisting paper layer and air permeable polypropylene layer.

15. A method of manufacturing a vacuum insulation panel, which includes:
a core material;
a surface material for covering the core material; and
an absorbent placed in a securing part of the core material,
wherein the securing part of the core material is formed by cutting the core material in shape and depth corresponding to shape and thickness of the absorbent and pressing the cut portion,
wherein the surface material is a multilayer film which includes a thermal bonding layer, a gas barrier layer, a first protective layer and a second protective layer, and
wherein the first protective layer is a polyamide layer and the second protective layer is a polyethylene terephthalate film (K-PET) of which outside is coated with polyvinylidene chloride (PVDC).

* * * * *